United States Patent Office 2,769,076
Patented Oct. 30, 1956

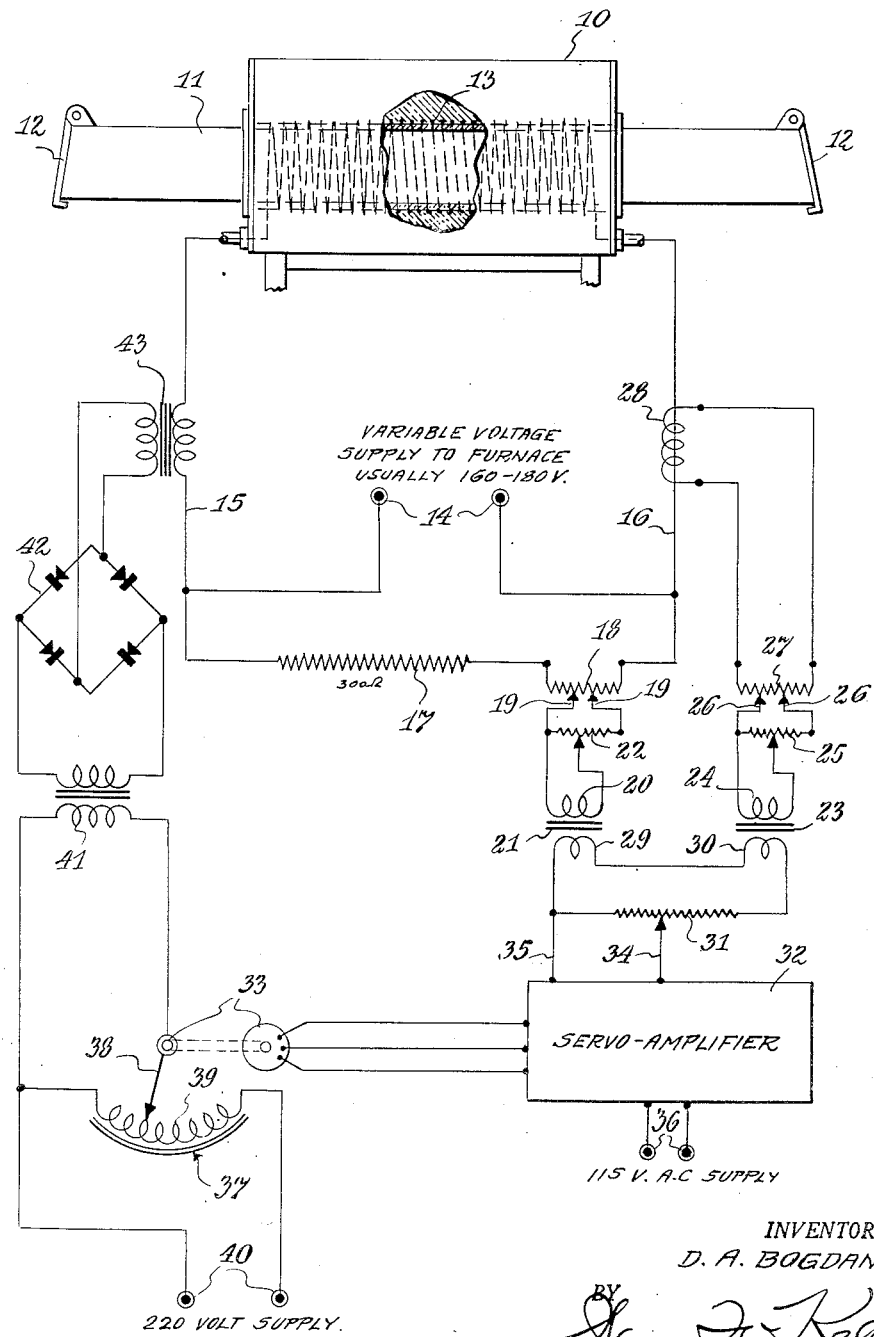

2,769,076
AUTOMATIC TEMPERATURE CONTROL FOR HIGH TEMPERATURE OVENS

David A. Bogdan, West Orange, N. J., assignor to Westinghouse Electric Corporation, East Pittsburgh, Pa., a corporation of Pennsylvania Application March 1, 1954, Serial No. 413,085

2 Claims. (Cl. 219—20)

High temperature ovens have been used heretofore which include a muffle having a molybdenum heater wire wound therearound to raise the temperature within the muffle to a heat in the range of 1700° C. average. Due to this high temperature, adequate means for measuring or regulating it have been long sought, particularly for use with ovens wherein a hydrogen atmosphere is employed, a circumstance which pertains in the lamp and electronic industries for avoiding oxidation of the work-pieces passed through or inserted into the muffle. Thermocouples are inadequate for the purpose since they have a temperature limit of approximately 1300° C., except for platinum thermocouples, and platinum thermocouples cannot be used in a hydrogen atmosphere. Furthermore, since the workpieces are carried on boats which are passed through or inserted into the muffle, it is impractical to have any instrument or part of an instrument protruding into the tunnel of the muffle, as such as instrumentality would interfere with or might be damaged by the boat or workpieces thereon. Furthermore, there are on the market, commercial optical pyrometers, but these require a target area on the muffle of such size that one or more convolutions of the heating element have to be omitted to provide for exposure of that area. This would result in a "cold spot," which is intolerable for obtaining the required uniformity of temperature along the length of the muffle. In fact, I have not found any mechanism on the market designed for heat measurement or regulation that is adaptable to the requirements referred to above.

Broadly considered, then, the invention proposes a practical solution to the problem posed in practice of obtaining high temperature control by means that will continue effective and serviceable whenever the muffle is heated and under a great variety of uses of the muffle.

Also, in its general aspect, the invention contemplates a sensing device readily applicable to present-day ovens and to those heretofore installed and in use.

More specifically, the invention provides a sensing device usable in the range of 1700° C. and above, and avoids needs for or use of thermocouples, pilot wires or other instrumentalities requiring insertion or presence in the muffle, and avoids cold spots created by target areas exposed by omission of heater convolutions.

Another object of the invention is to utilize the heater element, by which the muffle is heated, also as the sensing element.

Furthermore, involved as an object of the invention is utilization of the effect of change in resistivity resulting from the heater wire acquiring high temperature.

Other objects, advantages and beneficial results will become apparent to persons skilled in the art to which the invention appertains as the description proceeds, both by direct recitation thereof and by implication from the context.

In the accompanying drawing, one exemplification is shown in the single figure wherein an oven with muffle and heater coil is shown with a diagrammatic indication of the circuit and associated apparatus.

Directing attention more specifically to the invention disclosed in said drawing, the reference numeral 10 designates an oven through which extends a muffle 11, D-shape in cross section with the flat face constituting the floor, and having hatches 12 at both ends so that a boat (not shown) may be introduced into the muffle and passed entirely through the same if desired. Within the oven is a heating element which is preferably an electrical heating coil 13 around the muffle and preferably of molybdenum or other refractory metal wire, and capable of producing oven temperature of 1700° C. and over when heated by current therethrough and capable of withstanding heat of that amount without material detrimental effect upon the coil. A variable voltage supply 14 is provided and connected by lines 15, 16 to said heating coil capable of applying a usual potential from 160 to 180 volts to the coil. The resistance of the coil is in the magnitude of 4.55 ohms and the current approximates 35 amperes.

In parallel with the heater coil 13 across said supply 14 is a cold resistor 17, of so large resistance, say 300 ohms, and of such a size that the minute current through it will not result in any appreciable heating and therefore the resistance of said resistor can be assumed as being constant. The current though this resistor is in the magnitude of a half ampere so as to be large enough not to be affected by stray currents, yet small enough to keep the involved components small. The current through this resistor passes through a resistive short circuit or shunt 18 and from which a portion of desired value may be picked off by taps 19 which have connection with the ends of primary 20 of a comparison transformer 21 by way of a potentiometer 22 in parallel therewith of appropriate character, the arrangement giving a 10 m. v. drop between the taps and across the potentiometer before the transformer. A companion comparison transformer 23 having a primary 24 has current fed thereto through a potentiometer 25 and connecting taps 26 from another shunt 27 which also introduces a 10 m. v. or less drop to the transformer 23. This second mentioned tapped shunt 27 derives its current flow from a current transformer 28, the primary whereof is in common with one line, as 16, feeding the heating coil 13 from voltage supply 14. Any variation in the voltage supply 14 therefore equally affects the voltage across the heating element 13 and across the cold resistor 17. However, since the current consumed by the oven heating coil will vary in consequence of its resistance varying under different temperature conditions, resistance increasing as the wire gets hotter, the variation affects current flow to companion comparison transformer 23 non-linearly whereas, since the cold resistor 17 maintains a constant resistance, the current to its comparison transformer 21 varies linearly. Consequently, difference in temperature from operation of the heating coil setting up a difference of resistance in that coil will be converted into a voltage unbalance between the comparison transformers.

While the above-mentioned voltage unbalance may be utilized for comparison or control purposes without inclusion of the comparison transformers, it is preferable to utilize those transformers for converting the difference in voltages therebetween to magnitudes usable with commercial amplifiers. Each comparison transformer accordingly has a secondary 29, 30 cooperating respectively with primaries 20, 24 thereof, the secondaries being herein shown in series with each other and with a potentiometer coil 31 affording a sensitivity control to an appropriate instrumentality for utilitarian purposes as for indicating and/or controlling current supplied to the heating coil 13. According to the present showing, the instrumentality mentioned comprises a servo-amplifier 32 which controls a reversible servo-motor 33.

As both the servo-amplifier and the servo-motor are devices readily obtainable on the market, little need be said as to their constructions. Suffice it to say, that the servo-amplifier not only receives signal input from the comparison transformers 21, 23 by connectors 34, 35, but also has a source of 110 volt A. C. current supplied thereto through lines 36. It may now be stated that the commercial or other A. C. source for the current through said lines 36 to the amplifier is the same source from which the 160–180 volt current at supply input 14 is derived, and may be the usual commercial 60 cycle A. C. current. The servo-amplifier accordingly functions to supply a driving current to the motor to advance the motor forwardly or in reverse according to phase characteristic applied to the amplifier from the comparison transformers. That is the input signal to the amplifier will vary in amplitude resulting in speed of response and phase (either same as or opposed to line phase) which determine direction of response. Thus, with the voltage supply subject to 60 cycle pulses, equal and opposite pulses produce no output to the motor which therefore stands still. But when the tube grids of the amplifier 32 are subjected to a signal from the compensating transformers 21, 23 in phase with source 36 a resultant A. C. voltage feeds the motor with current in one direction whereas a signal of opposite phase causes a similar but opposite phase voltage to feed the motor with current in an opposite direction. The phase status consequently determines whether the motor will be rotated forward, in reverse, or retained at status quo.

The servo-motor 30, by direct mechanical or other connection with a device known as a covat (continuously variable auto transformer) designated in general by numeral 37, oscillates a contact arm 38 in variable position engagement with the winding 39 of the variable auto transformer connected to a source of supply, such as a 220 volt alternating current power line 40. One side of that line feeds one end of a transformer 41 the other end of which connects back to the other side of the line through said arm 38 and a part of said winding 39. The secondary of this transformer 41 applies its output to a dry disc or other suitable rectifier 42 from which the rectified current goes to a saturable reactor 43 the output of which is applied in series with the heating coil 13. This reactor constitutes a varying impedance and subtracts voltage from the 160–180 volt supply 14 for said coil, it being appreciated that the variation relates back to the position of the covat setting of arm 38 automatically by the servo-motor 33 as operated by the servo-amplifier 32 due to phase difference produced as a result of current flow in the heating coil feed line. The various parameters are selected to thereby maintain a constant temperature of the selected temperature of, for instance 1700°, in the heating coil by subtracting more or less current from the heating current as the coil, due to being heated, becomes less or more conductive. Consequently, by my invention, the heat of the coil, varying resistance thereof, automatically regulates the heating current to maintain the coil at a substantially constant temperature.

Summarizing the operation, it is pointed out that the resistance of the oven heating coil 13 is automatically compared with that of an external resistor 17, operating with negligible heat production, and arranged to avoid line voltage fluctuations, with the comparison functioning automatically to convert the difference in resistances into a signal the phase of which will vary according to whether the temperature of the heating coil is higher or lower than that required for the coil to function at a constant prearranged desired temperature. The signal is amplified to energize a servo-motor 33 which is operated thereby in one direction or another and thereby mechanically controls a covat 37 to in turn regulate a bucking current and hold the coil heating current at a level balanced with the need for more current to overcome increased resistance of the heating coil which is inherently more resistive when raised in temperature. Specifically the control is applied with respect to molybdenum, tungsten and other suitable refractory metals constituting a heating coil and adaptable to minute changes in resistance thereof resultant from small changes of temperature above or below a selected desideratum at which the coil is to be maintained in use.

I claim:

1. An automatic temperature control comprising in combination with an electric heating element, resistance whereof differs at different temperatures, a power supply line for electrical energy to said heating element, said line having a cold resistance thereacross of at least double the resistance of the said heating element, and a pair of comparison devices, one for said heating element and one for the cold resistance and adapted to convert differences in resistance of said heating element into a voltage unbalance between said devices, said devices comprising a transformer primary energized from the energy in said cold resistance, a second transformer primary energized from the energy in said power line to said heating element, the secondaries of the two said primaries being in series with each other and a potentiometer and responsive to the voltage unbalance applied to said primaries, and reversible and progressive means for progressively utilizing the voltage unbalance to adjust the current supply to the said heating element to substantially maintain constant temperature of said heating element.

2. An automatic temperature control comprising in combination with an electric heating element, resistance whereof differs at different temperatures, a power supply line for electrical energy to said heating element, said line having a shunt line thereacross and including a cold resistance therein having a substantially constant resistance in comparison to said heating element, a transformer primary energized from the energy in the shunt line, a second transformer primary energized from the energy in the power line to said heating element, a secondary for the two said primaries responsive to voltage unbalance applied to the primaries, a servo-amplifier progressively responsive to and adapted to distinguish between phase shift applied thereto by said secondaries, a servo-motor reversibly and progressively energized by said servo-amplifier, a covat operated by said motor, and a rectifier having its input connected to and subject to progressive change of current supply from said covat and having its output applied to said heating element power line for progressively varying the current in said power line to said heating element, whereby the temperature of said heating element is maintained substantially constant by variation of current supplied thereto by compensation for variation of resistance resultant from minute changes of temperature of said heating element.

References Cited in the file of this patent

UNITED STATES PATENTS

| 1,183,814 | Haagn | May 16, 1916 |
| 2,158,135 | MacFarlane | May 16, 1939 |
| 2,429,827 | Lamm | Oct. 28, 1947 |
| 2,510,770 | Bohn | June 6, 1950 |
| 2,709,216 | Moran et al. | May 24, 1955 |
| 2,732,477 | Runaldue et al. | Jan. 24, 1956 |

OTHER REFERENCES

Reynolds: Review of Scientific Instruments, vol. 25, No. 8, August 1954, pp. 838, 839.